United States Patent Office.

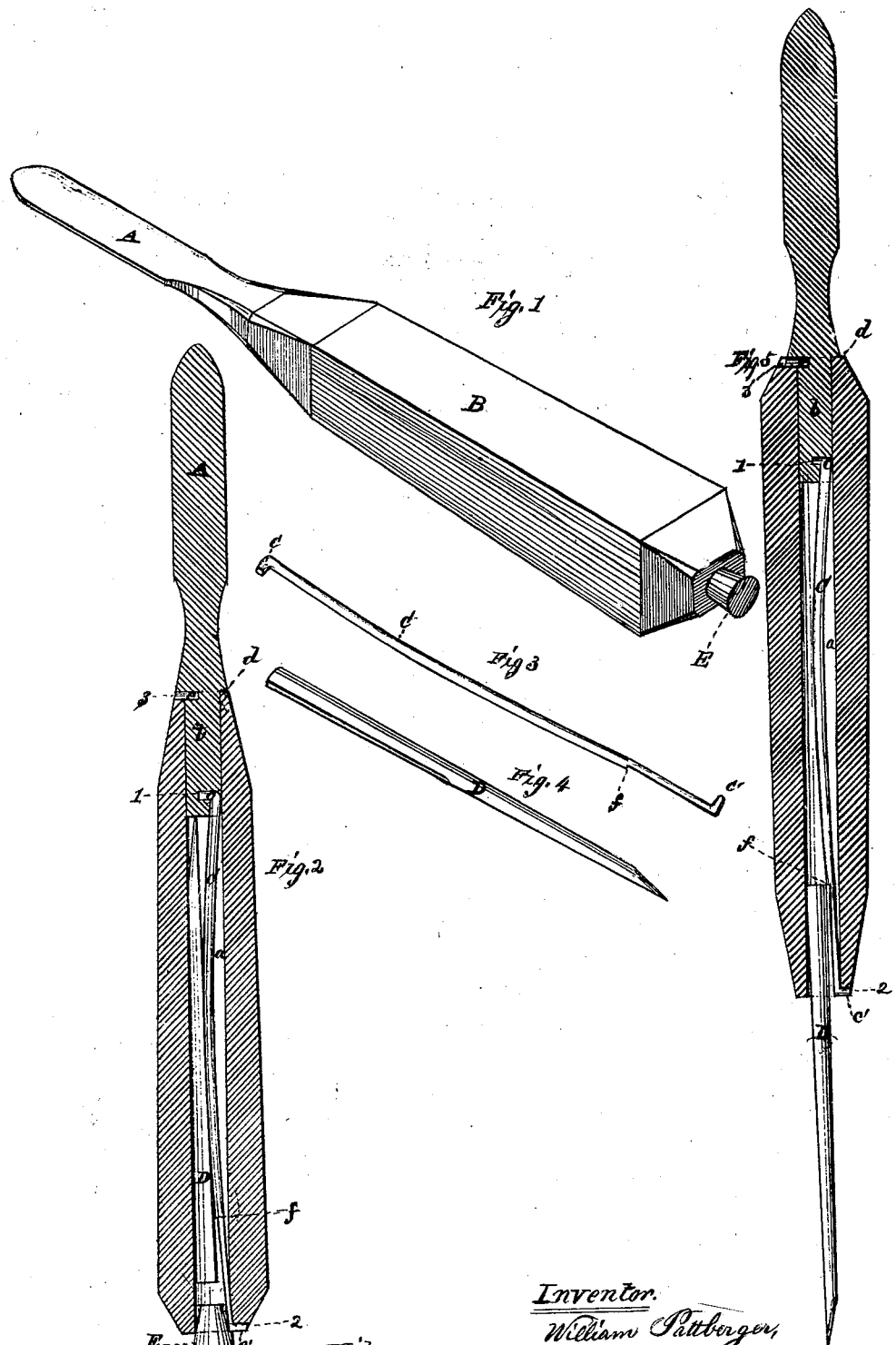

WILLIAM PATTBERGER, OF PHILADELPHIA, PENNSYLVANIA.

Letters Patent No. 98,102, dated December 21, 1869.

IMPROVEMENT IN COMBINED OYSTER-KNIFE AND ICE-PICK.

The Schedule referred to in these Letters Patent and making part of the same.

I, WILLIAM PATTBERGER, of the city of Philadelphia, and State of Pennsylvania, have invented certain Improvements in Clam and Oyster-Knives and Ice-Picker combined, of which the following is a specification.

The nature of my invention consists in a combined oyster-knife and ice-pick, and is constructed with a rod or wire, which connects at one end with the shank of the blade by means of a hook at one end, the said shank and rod being passed through a central bore of the handle, and a hook on the other end of the rod being pressed into a cross-groove in the end of the handle, to hold the shank firmly in place.

The rod being so placed, is held securely against a side of the central bore above mentioned, by means of a stopple, which I make of gum or cork, to keep out the water and prevent the parts rusting; and the wire is of such length as to draw the shoulder of the shank firmly against the contiguous end of the handle, to exclude the water at that end.

The blade is kept from turning in the handle, by means of a pin which projects from one side of the shank, and fits in a cross-groove in the end of the handle. This groove is like the groove in the other end of the handle, mentioned above, to provide for reversing the ends of the latter, as hereinafter described.

The invention further consists in the combination of an ice-picker with the handle, which is kept in the central bore above mentioned, when not in use, and arranged in proper position for use when wanted, as hereafter described.

To enable others skilled in the art to which my improvement appertains, to make and use my invention, I will now give a full description thereof.

In the accompanying drawings, which make a part of this specification—

Figure 1 is an isometrical view of the improved clam and oyster-knife, which, in its outward appearance, is similar to the ordinary implement.

Figure 2 is a longitudinal section of the same.

Figure 3 is a perspective view of the rod C.

Figure 4 is a like view of the picker D.

Figure 5 is a longitudinal section with the ice-picker D, in connection with the handle B.

Like letters in all the figures indicate the same parts.

A is the blade, and
B is the handle or stock.

The handle is constructed with a central bore, $a$, in which the shank $b$ of the blade A is placed, at either the small or large end of the handle, as may be desired, and is securely held by means of the rod or wire C, one end of which has a hook, $c$, which is placed in a hole in one side of the shank $b$, at the point 1. The other end has a like hook, $c'$, which engages with the opposite end of the handle by means of a cross-groove in the end of the latter at the point 2.

The wire C is of such length as to bring the shoulder $d$ of the shank $b$ firmly against the contiguous end of the handle, and prevent water passing in, and thus preventing the joint rusting.

There is a pin, $e$, which projects from one side of the shank $b$, and enters a cross-groove in the end of the handle at the point 3, to prevent the shank turning, so as to keep the blade A in its normal position.

The arrangement of the several parts thus described, is seen in figs. 2 and 5.

The groove at the point 3 is made like the one at the point 1, so that the knife or blade A may be connected with either end of the handle B, to suit the business.

It will readily be seen that the construction of the blade and handle in separate pieces, as above described, admits of an indefinite number of blades being used in succession with a single handle, so that as one wears out it may be replaced with a new one, or a different kind of knife may take the place of one in connection with the handle, at any time, to suit the work to be done.

Another advantage will be seen in the fact that the blades can be tempered more evenly and better, separately, than when made in connection with the handle, in the usual manner, and are not so liable to be burned in tempering; but the fact that a new blade may take the place of a worn-out or broken one, at a very little cost, is a great desideratum.

I combine, with the handle B, an ice-picker, D, as seen in fig. 5, the butt end of the picker coming against the shoulder $f$ of the connecting-rod C.

The rod is represented in detail in fig. 3, and the picker in fig. 4.

When the picker is not in use, it is placed in the bore $a$ of the handle B, as represented in fig. 2.

There is a cork or gum stopple, E which closes the outer end of the bore $a$, and effectually prevents the ingress of water. It also, by bearing against the side of the rod C, keeps the latter against the contiguous side of the bore $b$, and thus prevents the hook $c'$ being disconnected with the groove in the end of the handle B.

When the knife has to be replaced, or the ends of the handle reversed, the stopple E is removed, and the ice-picker D dropped out of the bore $b$. Then, by pushing the hook $c'$ out of its connection with the groove in the end of the handle B, a light tap on the end of the rod C will disengage the blade from the handle.

The rod C may then be connected, in like manner, with the same or another knife, as above described, and the knife connected with the handle in like manner, as above mentioned.

Instead of the shank *b* being connected to the handle B, as described, it may be screwed into the bore *a*.

What I claim as of my invention, and desire to secure by Letters Patent, is—

The blade A, hollow handle B containing the bent spring C, held in place by the cork or stopple E, and ice-picker D, arranged substantially as described.

In testimony that the above is my invention, I have hereunto set my hand and affixed my seal, this 19th day of October, 1869.

WILLIAM PATTBERGER. [L. S.]

Witnesses:
STEPHEN USTICK,
W. W. DOUGHERTY.